United States Patent Office 3,244,589
Patented Apr. 5, 1966

3,244,589
ALKYL PHENOXY POLYETHOXY ETHER SPERMICIDAL AEROSOL
Joseph Sunnen, 400 S. Warson Road, Clayton 5, Mo., and James R. McCowan, Bridgeton, Mo.; said McCowan assignor to said Sunnen
No Drawing. Filed Oct. 26, 1962, Ser. No. 233,434
8 Claims. (Cl. 167—58)

The present application is a continuation-in-part of our copending application Serial No. 841,046, filed September 21, 1959 (now abandoned).

The present invention relates to chemical compositions, specifically, the present invention relates to spermicidal compositions packaged with volatile propellant in a pressure container.

Present spermicidal compositions include jellies, creams, foam producing tablets and suppositories. All of these materials when used alone or with mechanical contraceptives, have disadvantages which limit their effective use.

For example, some compositions irritate the delicate tissues of the women. Even if the compositions are non-irritating, the jellies and creams often fail to adhere to the cervical os or cause objectionable discharge and leakage. Suppositories often fail to melt and thus can offer no protection to conception. There are also variations in the melting time of the suppositories among different women and even in the same women dependent upon the time in the menstrual cycle. Foam tablets are subject to the same objections as suppositories as well as their effectiveness being dependent upon the quantity and persistence of the foam formed.

Present contraceptives have a spermicidal composition incorporated in water soluble bases, water-in-oil emulsions, or oil-in-water emulsions. All of these materials are subject to the foregoing objections and it is an object of the present invention to provide a spermicidal composition in a stable foamed form which overcomes the hereinbefore mentioned objections to present spermicidal materials. More particularly, it is an object to provide a spermicidal composition which is easily dispensed, covers the cervical os to provide a mechanical barrier to spermatozoa, is not objectionable to use, does not cause undesirable discharge after use, and provides an effective spermicide in significantly smaller doses than present spermicidal compositions.

Our copending application Serial No. 841,046 covers compositions containing spermicidal agents which are dispensed from a container and applied in foam form.

The present application covers similarly foamed compositions of greatly enhanced spermicidal activity and of substantially increased spermicidal power. To the primary active ingredient of application Serial No. 841,046, alkyl phenoxy polyethoxy ether, we have added ethylene oxide-polypropylene glycol ethers having the following representative formula:

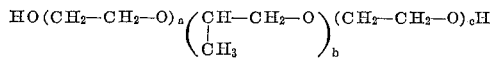

The compounds comprise about 80% ethylene oxide, with the number of moles of propylene oxide being variable. The average molecular weight of the preferred ether is about 7500–8000 and the average molecular weights vary from about 2200 to about 12,000. These compounds are described in U.S. Patent No. 2,674,619.

Other objects and advantages will become apparent hereinafter.

The present invention comprises a spermicide, an ethylene oxide-polypropylene glycol ether and a volatile propellant packaged in a pressure container whereby a foam containing an effectively dispersed spermicidal agent is produced when the pressure is released.

The invention further consists in the process hereinafter described and claimed and in the spermicidal compositions made by said process.

The spermicidal composition is packaged in a suitable pressure container, which can be metal, glass, plastic, etc. A discharge valve is fitted to an opening in the container from which the spermicidal composition is dispensed. The valve is a manually operated type and can be any valve normally used in an aerosol type dispenser, such as that shown in U.S. Patent No. 2,655,480. When the valve is opened, a thick foam is released containing the spermicide dispersed in the foam particles.

A suitable applicator is used in conjunction with the container to dispense the foam, the applicator being adapted to engage the valve opening on the container and to thereby be filled with foam from the container. The applicator then can be inserted into the vaginal opening of the woman, and the foam ejected from the applicator and applied to the cervix.

The contraceptive effectiveness of a chemical substance depends upon two major factors, that is, its spermicidal qualities and its occlusive properties. The product should be able to immobilize rapidly the spermatozoa with which it comes in contact, and it should adhere to the cervix thereby forming a physical barrier to sperm entry into the cervical canal.

It has been found that the composition of the present invention has good spermicidal properties and also the increased advantage over present jellies and creams of good adhesion to the cervix. The spermicide is dispersed in the thick stable foam to provide a large effective spermicidal surface. Present jellies and creams need a considerably larger quantity of active spermicidal material to provide the same contraceptive effects as the present composition. In other words, the bulk of the applied material is foam carrying a small quantity of spermicide dispersed therethrough.

This is a readily discernible advantage, since the active ingredients are considerably higher in price than the foam producing components.

Another advantage of the present invention is that the present composition is a stable foam which adequately covers the cervix and cervical os and mechanically prevents the sperm from entering the uterus through the cervical os. Even if a chemical agent is highly spermicidal and non-irritating, if it is incorporated in a base which does not adhere to the cervix or from which the spermicidal ingredients cannot diffuse out rapidly, it is not an effective contraceptive.

The present invention is applied to the internal organs before intercourse, preferably about 30 to 40 minutes prior to intercourse. It should not be removed (as by douching) for from 6–8 hours after intercourse to insure its effectiveness, and can be allowed to remain in the vaginal opening indefinitely without objectionable leakage.

In testing the present invention for adhesiveness, a unit dosage is deposited in the vagina and permitted to remain there for from five to ten minutes. A speculum is then inserted and the wall of the vagina and the cervix are inspected to determine if the foam has spread along the walls of the vagina and over the cervical os. It has been found that the present composition adequately spreads through the vagina and over the cervical os. The composition of the present invention also has a propensity for combining with cervical mucous.

When the compositions of the present invention are tested by Modified Brown & Gamble and Modified Sander & Cramer tests, they exhibit satisfactory spermicidal activity and satisfy the test requirements for a spermicidal material.

Detailed results of Modified Sander & Cramer tests covering the improved compositions of the present invention as compared to a control and to the compositions of Serial No. 841,046 will be given hereinafter.

The present composition is a thin liquid in the container, however when it is released through the valve opening, it is a smooth, white, thick foam. The foam is adherent to interior body surfaces and has a heavy persistent, lasting consistency, in this respect being considerably different from present foamed products as shampoos and shaving foams. After the foam has disappeared, a substantially sperm impermeable film remains on the interior body surfaces.

The present composition comprises a spermicide, an ethylene oxide-polypropylene glycol ether, an adhesive, an oil-in-water emulsion vehicle and a propellant. The spermicide, ethylene oxide-polypropylene glycol ether, adhesive, and emulsion vehicle make up what is called the emulsion concentrate. The emulsion concentrate comprises from about 85% to about 95% by weight of the package contents with the propellant being from about 5% to about 15% by weight of the package contents.

The preferred package composition contains about 90% by weight of emulsion concentrate and about 10% by weight of volatile propellant.

The active spermicidal ingredients include an alkyl phenoxy polyoxyethylene ethanol having a formula as follows:

$$RC_6H_4O(CH_2CH_2O)_{n-1}CH_2CH_2OH$$

Where R is an alkyl radical having from 1 to 22 carbon atoms and R preferably is a nonyl radical having the following formula:

$$CH_3(CH_2)_8-$$

And where $n$ is an integer from 8 to 11 and preferably $n$ is an integer from 9 to 10. From about 7% to about 10% of this compound by weight of the emulsion concentrate is used and preferably about 8% by weight is used for optimum efficacy.

A minor portion of another spermicidal agent may be used, if desired. This agent is di-isobutyl ethoxy ethyl dimethyl benzyl ammonium chloride, monohydrate, having a formula as follows:

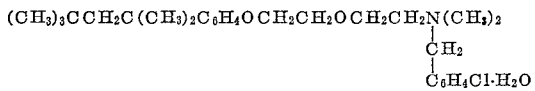

The composition may be formulated without this ingredient and still retain its spermicidal power, however, the preferred formulation contains a minor portion of this compound, preferably about 0.2% by weight of the emulsion concentrate. The addition of this compound gives a formulation which seems to have more satisfactory overall physiological effects. This compound also has deodorant and antiseptic properties as well as spermicidal qualities.

We have found that the addition of from about 0.5% to about 12% of an ethylene oxide-propylene glycol ether results in a composition of superior spermicidal power. The ethylene oxide-polypropylene glycol ether sold by Wyandotte Chemicals Corp. under the name Pluronic and has a formula as follows:

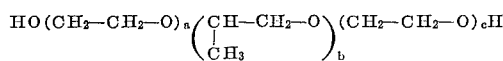

The compounds are about 80% ethylene oxide with differing moles of propylene oxide. In general, these compounds are non-ionic surfactants and are prepared by condensing ethylene oxide with a hydrophobic base formed by the condensation of propylene oxide with propylene glycol. The foregoing compound has molecular weight from about 2200 to about 12,000. When the molecular weight gets below about 2200, the composition has a cloud point above normal room temperature and the material tends to be water insoluble. Similarly, as the molecular weight gets above about 12,000, the material also becomes water insoluble. Insoluble ingredients have a detrimental effect on the final foam which is produced.

The adhesive or film forming compound is extremely important to the success of this composition as a contraceptive. If there were no filming agent incorporated into this composition, when the foam vanished, the composition would lose its effectiveness as a contraceptive. The film containing the spermicide is deposited on the cervix as the foam disappears, and the film remains there as a barrier to the entry of sperm into the cervical canal long after the foam is gone. The foam may not adhere to the cervical os because of cervical mucous or moisture. Under these circumstances, the filming agent of this invention causes the foam to adhere to the vagina walls and cervical os. After the foam has disappeared a film of material having spermicidal properties is deposited on the cervical os to continue to give contraceptive protection even though the foam has vanished.

The preferred film forming agent is polyvinylpyrrolidone. Another suitable film forming agent is carboxyl methyl cellulose. The preferred amount of filming agent is about 1% by weight based on the weight of the emulsion concentrate, although up to about 5% by weight may be used, if desired. Glycerol monstearate adds bulk and density to the film and gives it staying properties. Combinations of the foregoing materials also may be used.

The emulsion forming base which embraces the remainder of the ingredients of the emulsion concentrate includes an oil phase comprising saturated long chain fatty acids such as myristic, stearic, lauric, palmitic, etc., triethanolamine or other alkaline substance to saponify part of the fatty acids to soaps which emulsify the oil phase in the water, and other compounds that contribute to foam stability such as glycerol monostearate and polyethylene glycol with a molecular weight betwen 200 and 1000. The oil phase preferably consists of about 8% to about 15% by weight based on the weight of the emulsion concentrate.

The ethylene oxide-polypropylene glycol ethers are surfactants and replace the surfactant phase of the composition of Serial No. 841,046. In addition to increasing the spermicidal power of the present composition, the ethylene oxide-polypropylene glycol ethers perform the surfactant functions of giving body, stability, and wetting power to the foam, and help emulsify the oil phase.

The remainder of the emulsion concentrate is water to make 100%.

The pH preferably is maintained at about 7.5 to favor foaming action and decrease the irritability of the substance on the vagina. However, a formulation having an acid pH can be used, if desired.

The propellant is a liquefied normally gaseous compound preferably a mixture of the low molecular weight halogenated hydrocarbons as haloalkanes. Among propellants which may be used are those sold under the trade name "Freon." The formula, boiling points and densities of these are as follows:

| Trade Name | Formula | B.P., ° C. | Density at 30° C. |
|---|---|---|---|
| Freon 11 | $CCl_3F$ | +23.77 | 1.464 |
| Freon 12 | $CCl_2F_2$ | −29.80 | 1.293 |
| Freon 21 | $CHCl_2F$ | +8.92 | 1.354 |
| Freon 22 | $CHClF_2$ | −40.80 | 1.175 |
| Freon 113 | $CCl_2FCClF_2$ | +47.57 | 1.553 |
| Freon 114 | $(CClF_2)_2$ | +3.55 | 1.440 |

The haloalkanes are preferred because they are compatible with the remainder of the ingredients and are non-irritating to the internal surfaces where the composition is applied. The preferred mixture of propellant is about 15% Freon 12 and about 85% Freon 114. Any suitable mixture may be used which gives substantially the same pressure when loaded with the emulsion concentrate into the package.

The method of compounding the present invention and various combinations of ingredients will be more fully shown in the following examples.

*Example I*

2 grams (g.) myristic acid is mixed with 4 g. stearic acid and heated at 70° C. until melted. 2 g. triethanolamine is added and mixed until saponification is complete. 69 g. water, 3 g. glycerol monostearate, 1.4 g. Carbowax 600 (polyethylene glycol of average mol. wt. 600), 3 g. Tween 20 (polyoxyethylene sorbitan monolaurate) and 3 g. Tween 80 (polysorbate 80 or polyoxyethylene sorbitan monooleate) are added and the mixture is stirred at 70° C. until a fine dispersion is maintained. The mixture is cooled to 35° C. with continuous stirring. 1 g. polyvinylpyrrolidone and 0.2 g. di-isobutyl phenoxy ethoxy ethyl dimethyl benzyl ammonium chloride are dissolved in 3.4 g. water and added to the mixture with stirring. 8 g. nonyl phenoxy polyoxyethylene ethanol are added to the mixture to complete formulation of the emulsion concentrate.

In forming the complete package, 90 g. of the emulsion concentrate and 10 g. of propellant including 1.5 g. Freon 12 and 8.5 g. Freon 114 are added to the container and pressurized by the method known as pressure filling. Presure filling consists of adding the emulsion concentrate to the container, purging air from the container by adding a droplet of liquefied propellant, capping the container with a valve and then adding the specified amount of liquefied propellant into the container through the valve by gravity flow or with the use of air pressure. The contents of the container comprise preferably about 90% by weight emulsion concentrate and about 10% by weight propellant, and may contain from about 85% to about 95% by weight emulsion concentrate and from about 5% to about 15% by weight propellant.

*Example II*

| | Percent |
|---|---|
| Tegacid (acid stabilized glycerol monostearate) | 3.75 |
| Stearic acid | 1 |
| Cetyl alcohol | 1 |
| Polyethylene glycol 400 | 3 |
| Tween 20 | 4 |
| Tween 80 | 4 |
| Sorbo (70% solution of sorbitol) | 3 |
| Di-isoburyl phenoxy ethoxy ethyl dimethyl benzyl ammonium chloride | 0.2 |
| Nonyl phenoxy polyoxyethylene ethanol | 8 |
| Polyvinylpyrrolidone | 1 |
| Water, to make | 100 |

Dibasic sodium phosphate to adjust pH to 5.

Example II is compounded in a manner similar to Example I. Example II has a pH of 5 which is acid, and gives satisfactory results as a contraceptive material. No triethanolamine is added and therefore no soaps are formed in this formulation.

*Example III*

| | Percent |
|---|---|
| Myristic acid | 2 |
| Stearic acid | 4 |
| Triethanolamine | 2 |
| Glyceryl monostearate | 3 |
| Tween 20 | 3 |
| Tween 80 | 3 |
| Polyvinylpyrrolidone | 1 |
| Polyethylene glycol 600 | 1.4 |
| Nonyl phenoxypolyethoxyethanol | 8 |
| Water, to make | 100 |

Sodium acid phosphate to adjust pH to 7.5–7.6.

Example III is formulated in a manner similar to Example I. However, Example III does not contain any di-isobutyl phenoxy ethoxy ethyl dimethyl benzyl ammonium chloride. The resulting product is satisfactory as a contraceptive.

Both Example II and Example III are packaged with a liquefied normally gaseous propellant in a pressure container as described in Example I.

*Example IV*

| | Percent |
|---|---|
| Myristic acid | 2 |
| Stearic acid | 4 |
| Triethanolamine | 2 |
| Glyceryl monostearate | 3 |
| Polyvinylpyrrolidone | 1 |
| Polyethylene glycol 600 | 1.4 |
| Ethylene oxide-polypropylene glycol ether (ave. mol. wt. 7500) | 4 |
| Benzethonium chloride | 0.2 |
| Nonylphenoxy polyethoxy ethanol | 8 |
| Deionized water | 74.4 |

Example IV is formulated in a manner similar to Example I, and is packaged with a liquefied normally gaseous propellant in a pressure container as described in Example I. 90 grams of the foregoing emulsion concentrate and 10 grams of propellant (1.5 g. Freon 12 and 8.5 g. Freon 114) are added to the container by pressure filling. The contents of the container may include about 85–95% emulsion concentrate and about 5–15% propellant.

Example IV has a viscosity of 1,900 cp. before being added to the container. When 0.5% ethylene oxide-polypropylene glycol ether is used, the viscosity of 1600 cp., and when 8% is used, the viscosity is 3500 cp.

When the composition of Example IV is tested by the Modified Sander-Cramer test wherein 2 cc. of foam (from the pressurized container) are mixed with 18 cc. of water to make a 1 to 10 dilution, it exhibits substantial spermicidal power. Other strength dilutions for testing are similarly made. 0.1 cc. of semen is placed in a beaker and 1 cc. of the dilution is added thereto and stirred with an electro magnetic beaker for 10 seconds. The mixture is examined under a microscope before an additional 10 seconds has elapsed and after the total time of 20 seconds there should be no live sperm. If live sperm are found, the dilution is reduced. The greater the dilution, the more effective the composition.

When the composition of Example IV is tested, it has an average spermicidally effective dilution value of 35 to 1, compared with an average value of 16 to 1 for a control and 3 to 1 for the composition of Example I.

Carbowax 600 can be obtained from Union Carbide & Chemical Corp., 30 E. 42nd Street, New York 17, New York.

A unit dosage of a conventional contraceptive jelly or cream contains about 10 times as much active ingredient as a unit dosage of the present invention thereby effecting a substantial economy as well as materially lessening the possibility of concentrated active ingredients becoming irritating to the delicate tisues where they are applied.

The invention is intended to cover all changes and modifications of the examples of the invention herein chosen for purposes of the disclosure, which do not constitute departures from the spirit and scope of the invention.

What is claimed is:

1. A spermicidal composition compatible with human muscosal tissue contained in a pressure container and consisting essentially of about 85% to about 95% of an emulsion concentrate and about 5% to about 15% of a liquified normally gaseous propellant, said emulsion concentrate itself consisting essentially of

where R is alkyl of 1–22 carbon atoms and $n$ is an integer of from about 8 to about 11, as an active effective spermicidal ingredient, up to about 5% by weight of a film forming agent selected from the group consisting of polyvinylpyrrolidone, carboxy methyl cellulose and mixtures thereof with glycerol monostearate, up to about 15% by weight of an oil phase comprising long chain fatty acids, a saponifying agent and polyethylene glycol having a molecular weight between 200 and 1000, said saponifying agent reacting with at least a portion of the fatty acids to form soap, about 0.5–12% by weight of ethylene oxide-polypropylene glycol ether of mol. wt. 2200 to 12,000, and a major portion by weight of water.

2. The composition of claim 1 wherein about 7% to about 10% of the active ingredient is present and which also includes about 0.2% di-isobutyl phenoxy ethoxy ethyl dimethyl benzyl ammonium chloride.

3. The composition of claim 1 wherein R is nonyl.

4. A spermicidal composition compatible with human muscosal tissue contained in a pressure container and consisting essentially of about 10% of a liquified normally gaseous halogenated hydrocarbon propellant, about 8% of $$RC_6H_4O(CH_2CH_2O)_{n-1}CH_2CH_2OH$$

where R is alkyl of 1–22 carbon atoms and $n$ is an integer of from about 8 to about 11, as an active effective spermicidal ingredient, about 1% by weight polyvinylpyrrolidone, about 3% by weight glycerol monostearate, about 2% by weight myristic acid, about 4% by weight stearic acid, about 2% by weight triethanolamine, about 1.4% by weight polyethylene glycol having a molecular weight of about 600, about 4% by weight of ethylene oxide-polypropylene glycol ether of average mol. wt. about 7500, and about 74% by weight of water.

5. The composition of claim 4 which also includes about 0.2% by weight di-isobutyl phenoxy ethoxy ethyl dimethyl benzyl ammonium chloride.

6. The composition of claim 4 wherein the propellant is a mixture of about 85% $(CClF_2)_2$ and about 15% $CCl_2F_2$.

7. A spermicidal composition compatible with human muscosal tissue contained in a pressure container and consisting essentially of about 85% to about 95% of an emulsion concentrate and about 5% to about 15% of a liquified normally gaseous propellant, said emulsion concentrate itself consisting essentially of $$RC_6H_4O(CH_2CH_2O)_{n-1}CH_2CH_2OH$$

where R is alkyl of 1–22 carbon atoms and $n$ is an integer of from about 8 to about 11, as an active effective spermicidal ingredient, up to about 5% by weight of a film forming agent selected from the group consisting of polyvinylpyrrolidone, carboxy methyl cellulose and mixtures thereof with glycerol monostearate, from about 8% to about 15% by weight of an oil phase comprising long chain fatty acids, a saponifying agent and polyethylene glycol having a molecular weight between 200 and 1000, said saponifying agent reacting with at least a portion of the fatty acids to form soap, about 0.5% to about 12% of surfactants of the class polyoxyethylene sorbitan monolaurate and polyoxyethylene sorbitan monooleate, and a major portion by weight of water.

8. The composition of claim 7 wherein from about 7% to about 10% of the spermicidal ingredient is present, wherein R is nonyl and which also includes about 0.2% of di-isobutyl phenoxy ethoxy ethyl dimethyl benzyl ammonium chloride.

References Cited by the Examiner

UNITED STATES PATENTS

| | | | |
|---|---|---|---|
| 2,467,884 | 4/1949 | Elias | 167—58 |
| 2,943,979 | 7/1960 | Elias | 167—58 |

OTHER REFERENCES

Shepherd, Aerosols: Science and Technology, Interscience Publishers, Inc., New York, N.Y. (1961), pp. 287–288 and 401.

Sobrero: Fertility and Sterility, 11:5, September-October 1960, pages 518–524.

JULIAN S. LEVITT, *Primary Examiner.*

FRANK CACCIAPAGLIA, Jr., *Examiner.*